Feb. 11, 1941. H. KING ET AL 2,231,165
METHOD AND MACHINE FOR APPLYING PROTECTIVE CAPS TO NAIL HEADS
Filed March 18, 1939 5 Sheets-Sheet 1

INVENTORS
Harry King and
William M. Bell
by their attorneys
Stebbins, Blenko & Parmelee Feb. 11, 1941. H. KING ET AL 2,231,165
METHOD AND MACHINE FOR APPLYING PROTECTIVE CAPS TO NAIL HEADS
Filed March 18, 1939 5 Sheets-Sheet 2

INVENTORS
Harry King and
William M. Bell
by their attorneys
Stebbins, Blenko & Parmelee INVENTORS
Harry King and
William M. Bell
by their attorneys
Stebbins, Blenko & Parmelee Feb. 11, 1941. H. KING ET AL 2,231,165
METHOD AND MACHINE FOR APPLYING PROTECTIVE CAPS TO NAIL HEADS
Filed March 18, 1939 5 Sheets-Sheet 5
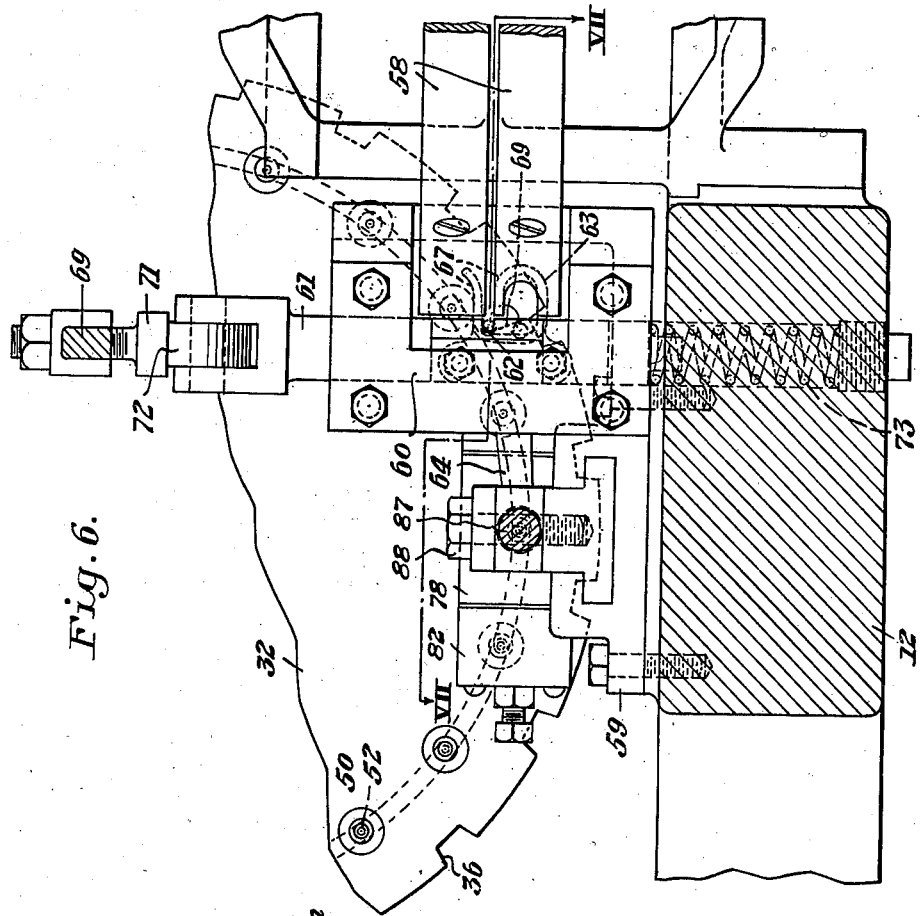
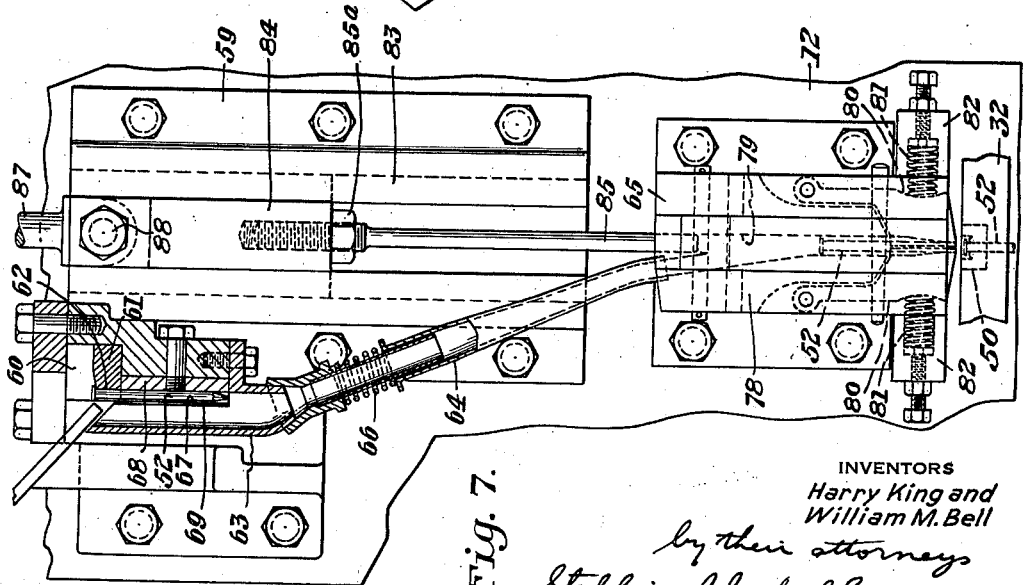
INVENTORS
Harry King and
William M. Bell Patented Feb. 11, 1941

2,231,165

UNITED STATES PATENT OFFICE 2,231,165

METHOD AND MACHINE FOR APPLYING PROTECTIVE CAPS TO NAILHEADS

Harry King and William M. Bell, Portsmouth, Ohio, assignors to Wheeling Steel Corporation, Wheeling, W. Va., a corporation of Delaware Application March 18, 1939, Serial No. 262,742

9 Claims. (Cl. 10—158)

This invention relates to a machine and method for the application of caps of protective material such as lead or the like to the heads of nails employed for special uses such as the securing or roofing sheets.

Automatic machines and methods for capping nailheads have been proposed heretofore but, so far as we are aware, manufacture of this commodity by the hot molding method has continued to be carried out by hand. It is the general object of our invention, therefore, to provide a machine and method for this purpose which avoid the objections inherent in the devices known heretofore and are characterized by such continuity of operation and efficiency of production as to make possible the manufacture of capped nails at a lower cost than has been possible up to this time.

In a preferred form and practice of our invention, we employ a supporting frame or housing having a turntable mounted therein for rotation in a substantially horizontal plane and provide molds therein whereby after properly positioning nails in the molds, cap-forming material may be poured around the heads of the nails. Subsequently to the pouring operation we subject the caps so formed to a final shaping as, for example, by a forming die. We also provide automatic means for inserting nails in the molds and removing them therefrom. Further details of the construction and operation and other novel features of the invention will be made apparent in the following description and explanation, referring to the accompanying drawings illustrating the embodiment and practice briefly outlined above. In the drawings:

Fig. 6 is a view partly in section along the plane of line VI—VI of Fig. 2 and partly in plan;

Fig. 7 is a view partly in section along the plane of line VII—VII of Fig. 6 and partly in elevation;

Fig. 10 is a central vertical section through a flash trimmer, a mold in alinement therewith and a capped nail partly ejected from the mold;

Figs. 13 and 14 are views similar to Figs. 11 and 12 showing a modified form of nail; and Fig. 15 is a central vertical section through a mold showing the modified form of nail therein with a cap formed on the head thereof.

For convenience and ease of understanding, the following detailed description will be divided into sections, each relating to one portion or feature of the apparatus.

General arrangement and drive

Figure 1:
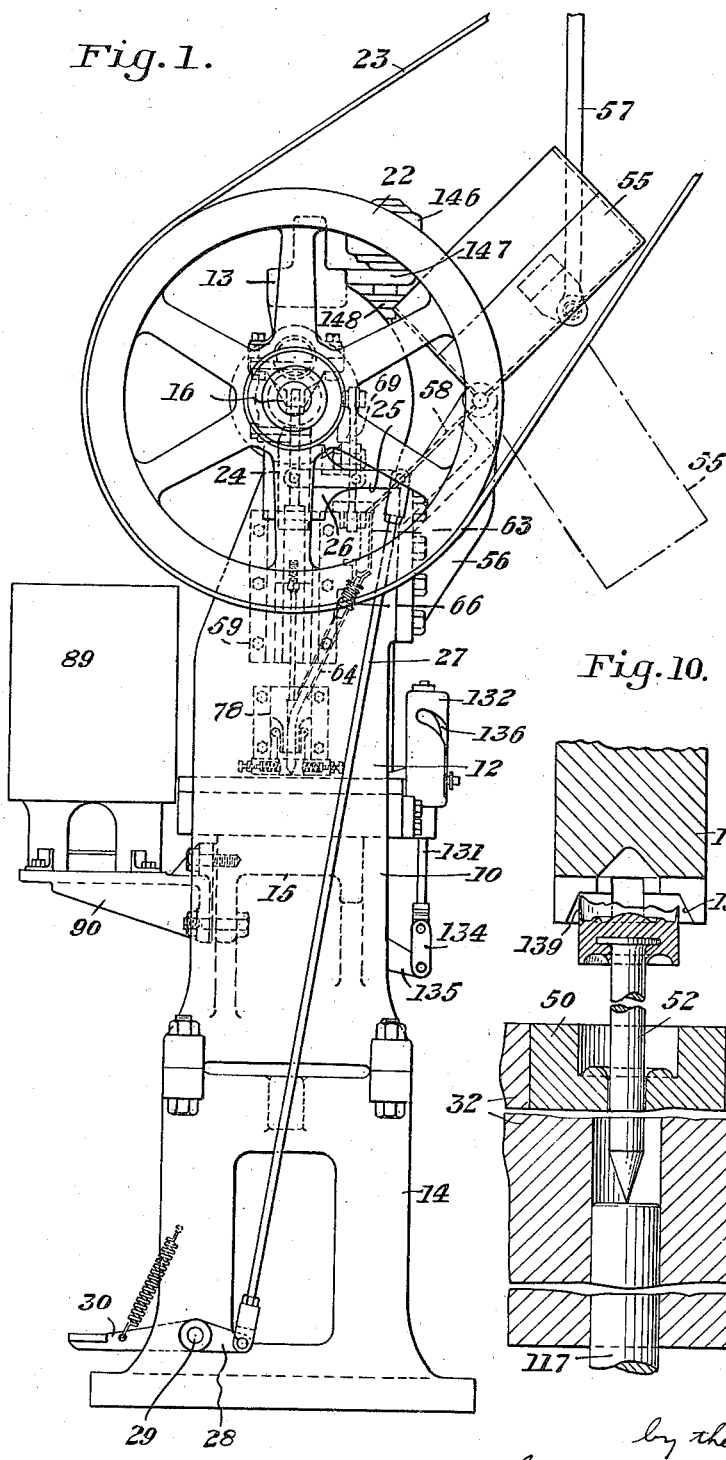
Fig. 1 is an end elevation of a machine embodying our invention.
Figure 2:
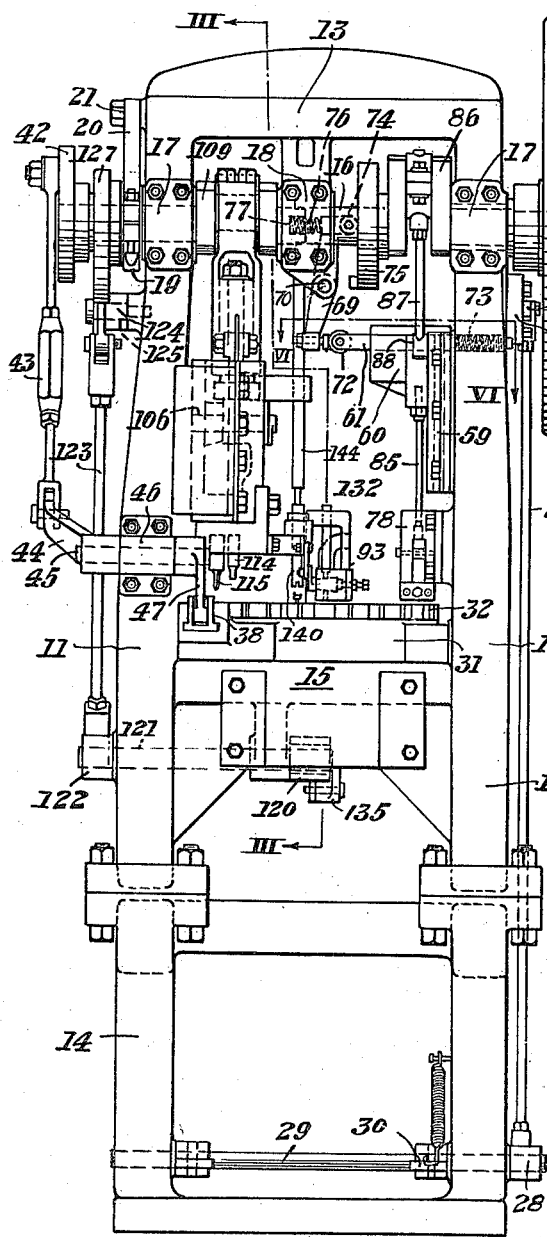
Fig. 2 is a side elevation thereof with parts omitted for the sake of clearness.

Referring particularly to Figs. 1 and 2, the capping machine of our invention comprises generally a housing or frame 10 including spaced standards 11 and 12 connected at the top by a transom 13. The housing 10 is secured to a base 14 which may be suitably mounted on any convenient foundation. A shelf 15 extends between the standards 11 and 12.

A crank shaft 16 is journaled in bearings 17 formed in the standards 11 and 12 and a third bearing 18 depending from the transom 13. A friction collar or drag brake 19 is disposed about the left-hand end of the shaft 16 as viewed in Fig. 2 and has a radial extension 20 anchored by a screw 21.

A fly-wheel 22 which is also adapted to serve as a pulley for a driving belt 23, is loose on the shaft 16, but the bore through its hub is provided with key-ways adapted to cooperate with a key (not shown) mounted in a slot in the shaft for movement axially and radially thereof. A wedging member 24 (see Fig. 1) is slidably mounted on the standard 12 and has a surface adapted to cause axial movement of the key. A guide in the slot having an inclined surface causes the key to move radially when it is moved axially, thus controlling the engagement of the key with one of the key-ways in the bore of the hub of the fly-wheel 22. The details of the clutch mechanism just described are not illustrated since any suitable type of clutch may be employed.

A lever 25 is pivoted on a bracket 26 carried on the standard 12 and is also pivoted to the member 24 for actuating it and retracting it. A link 27 is pivoted to the lever 25 and to a crank 28 on a shaft 29 journaled in the base 14. A treadle 30 is mounted on the shaft 29 whereby the operator, by stepping on the treadle, causes the clutch to be engaged whereupon the fly-wheel 22 drives the shaft 16. Similarly, as soon as the treadle 30 is released, the clutch mechanism is actuated to permit the fly-wheel to turn freely on the shaft 16.

Turntable

Referring now more particularly to Figs. 2 through 5, a bed 31 is secured to the shelf 15 and provides a support for a turntable 32 rotatably disposed thereon. A stud 33 threaded into the bed provides a central bearing for the table 32. A friction disc 34 held against the table by a nut 35 threaded on the stud, exerts a slight braking effect on the table.

The periphery of the table 32 is notched as at 36 for cooperation with a pawl 37. The pawl 37 is pivoted on a slide 38 movable in guides 39 formed on the shelf 15 adjacent the standard 11. The slide 38 is reciprocated on rotation of the shaft 16 by means which will now be described. A spring 40 connected to a lever 41 urges the pawl 37 toward the turntable, as the pawl and lever are secured to a common stub shaft journaled in the slide 38.

A crank disc 42 is secured to the extreme left-hand end of the shaft 16 as viewed in Fig. 2. A link 43 is pivoted to the disc 42 and to a crank 44. The crank 44 is secured to a shaft 45 journaled in a bearing 46 mounted on the standard 11. A crank 47 secured to the shaft 45 has an elongated eye or slot 48 adapted to receive a pin 49 extending transversely across the slide 38 adjacent one end thereof. The various parts just described are so designed that a reciprocation of slide 38 is effected on each revolution of the shaft 16, the stroke of the slide being sufficient to advance the table one notch on each reciprocation thereof.

Figure 8:
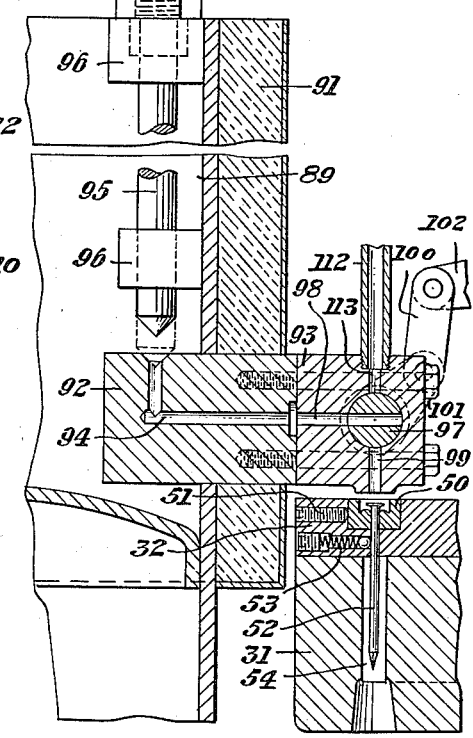
Fig. 8 is a sectional view taken substantially along the plane of line VIII—VIII of Fig. 5.
Figure 11:
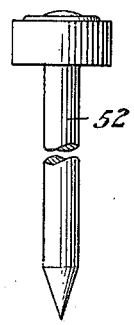
Fig. 11 is an elevation and Fig. 12 a plan view of a finished nail.
Figure 12:
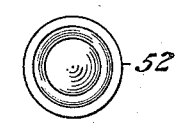
Figure 3:
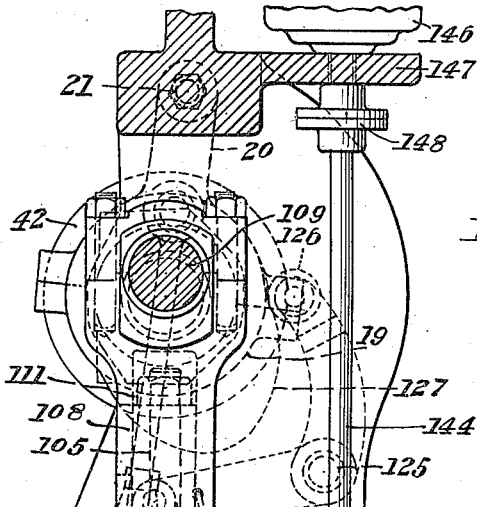
Fig. 3 is a partial sectional view to enlarged scale taken substantially along the plane of line III—III of Fig. 2.
Figure 5:
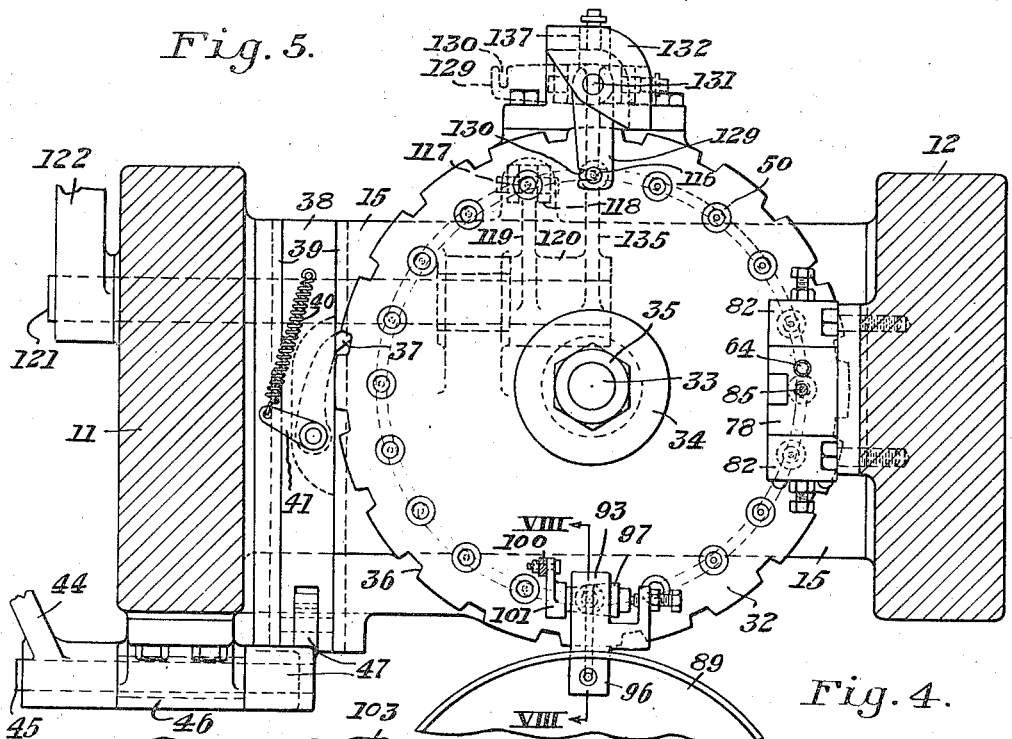
Fig. 5 is a view partly in section along the plane of line V—V of Fig. 4 and partly in plan.
Figure 4:
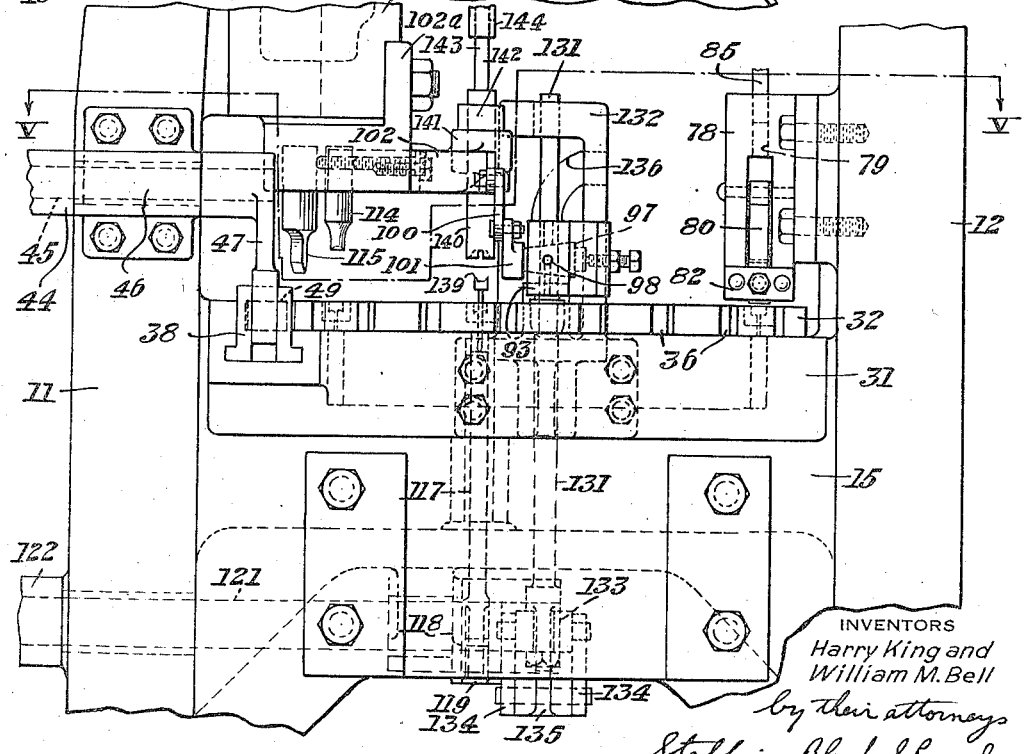
Fig. 4 is a partial side elevation showing a portion of the mechanism seen in Fig. 2, to enlarged scale.

The turntable 32 is provided with a plurality of molds 50 spaced circumferentially thereof, the number of molds corresponding to the number of notches 36. As shown in Fig. 8, the molds 50 are secured in sockets formed in the table by set screws 51. The molds and table have alined holes therethrough adapted to receive the shanks of nails 52. Radial bores 53 in the table 32 intersect the holes for the nail shanks and are provided with a spring-pressed member adapted to engage the shank of a nail inserted through the mold and hold it at any desired elevation therein. The bed 31 has an annular slot 54 to receive the shanks of the nails inserted in the molds.

Nail feed

The nail feeding mechanism is shown in Figs. 1, 2, 6 and 7. A nail shaker pan 55 is pivoted to a bracket 56 secured to the standards 11 and 12. Such devices are well-known and require no detailed description. The pan 55 is oscillated by any convenient means such as a link 57 which may conveniently be pivoted to a crank shaft or the like. On oscillation, the pan 55 jostles nails disposed therein and eventually feeds therefrom a row of nails with points down, between spaced, inclined guides 58.

A bracket 59 secured to the standard 12 supports a nail feeder indicated generally at 60.

The feeder 60 includes a slide 61 movable longitudinally therethrough and having a notch 62 adapted to aline with the space between the guides 58 through which the nails are fed downwardly from the pan 55. The feeder 60 also includes a funnel 63 connected to a tube 64 leading into a nail feeding chuck 65. The tube 64 includes a telescoping joint 66 for a purpose which will appear later. The funnel 63 is not closed but has spaced walls 67 in alinement with the space between the guides 58 to admit the shanks of nails descending along the latter. A plate 68 secured to the nail feeder has a beveled or inclined surface 69 effective on reciprocation of the slide 61 to cause a nail caught in the slot 62 to be dislodged therefrom and dropped through the funnel 63. On return of the slide 61, of course, the next nail in the row enters the slot 62.

The slide 61 is reciprocated by a lever 69 pivoted at 70 in a bearing carried on the same depending portion of the transom 13 as the bearing 18. The lower end of the lever 69 is provided with a tappet 71 threaded therethrough whereby it may be adjusted. The tappet 71 bears against a roller 72 journaled at the left-hand end of the slide 61 as viewed in Fig. 2. The other end of the slide 61 is engaged by a compression spring 73 disposed in a bore through the standard 12.

The lever 69 is provided at its upper end with a roller 74 bearing on a side cam 75. The cam 75 is composed of two parts, being split along a diameter for assembly about the shaft 16. A compression spring 76 disposed in a socket 77 bears against the upper end of the lever 69 to hold it against the cam 75. The socket 77 is formed in the depending portion of the transom 13 which carries the bearing 18. It will be apparent that rotation of the shaft 16 and the cam 75 will cause oscillation of the lever 69 and reciprocation of the slide 61 to feed nails successively from the guides 58 downwardly through the funnel 63 and tube 64.

The nail feeding chuck 65 comprises a guide block 78 secured to the standard 12 below the bracket 59, having a nail passage 79 therethrough. Jaws 80 pivoted in the block 78 co-operate to guide a nail forced downwardly through the passage 79. The block 78 is so disposed that a nail emerging from between the jaws 80 will be accurately alined with the hole extending through one of the molds 50 on the table 32 when the latter is arrested between successive step-by-step movements. The jaws 80 are adjustably urged against each other by springs 81 disposed within socket members 82 secured to the block 78.

Figure 9:
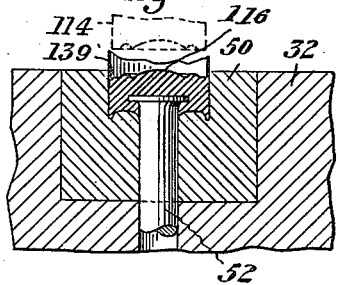
Fig. 9 is an axial section through one of the molds, taken on a plane at right angles to the section of Fig. 8.

The bracket 59 is provided with guides 83 in which a slide 84 is reciprocable. A plunger 85 is secured to the lower end of the slide 84 and is adapted to enter the passage 79 of the block 78 through a suitable opening. The plunger 85 is threaded into the slide 84 for purposes of adjustment relative thereto and is provided with a lock nut 85a. It will be apparent that reciprocation of the plunger 85 is effective, after a nail has been fed downwardly through the funnel 63 and tube 64 into the passage 79, to force the nail down between the jaws 80 and into a mold 50 in alinement therewith. The plunger 85 is so adjusted relative to the slide 84 as to force the nail downwardly into the mold to the desired extent, viz., as shown in Figs. 7, 8 and 9, so that the head of the nail is spaced slightly above the bottom of the mold. The nail is held in this position by the frictional engagement thereof of the spring-pressed plunger in the bore 53.

Reciprocation of the slide 84 on which the plunger 85 is mounted, is effected by a crank 86 on the shaft 16 and a pitman 87 carried by the crank and pivoted to the slide at 88.

The pouring mechanism

A container 89 for cap-forming material is mounted on a bracket 90 secured to the shelf 15 (see Fig. 1). If the caps are to be formed from molten lead, the container 89 is preferably lagged as at 91 and provided with a suitable burner for maintaining the contents thereof molten. A bored block 92 extends through the wall of the container 89. A block 93 providing a valved dispensing spout is secured to the block 92. A passage 94 in the block 92 is adapted to be closed by a plug 95 rotatably carried in bearings 96 mounted on the interior of the wall of the container 89. The block 93 is provided with a plug valve 97 having a transverse bore adapted to aline in one position with a bore 98 in the block and in the other with a bore 99. The bore 98 communicates with the passage 94 in the block 92 while the bore 99 is in alinement with the molds 50 when they stop between successive step-by-step movements of the turntable 32.

The valve 97 is actuated by a link 100 pivoted to a crank 101 at one end of the valve and to a bracket 102 which is secured to a bracket 102ᵃ which in turn is secured to a cross-head 103 reciprocable in ways 104 secured to the standard 11. An eye-bolt 105 is pivoted to the cross-head at 106 and extends upwardly therefrom to an adjusting sleeve 107 threaded into the lower end of a pitman 108 carried on a crank 109 formed on the shaft 16. The lower end of the pitman is split axially and is provided with clamping bolts 110. The position of the cross-head 103 at any point in the stroke of the pitman 108 may thus be adjusted by loosening the bolts 110 and turning the sleeve 107. After adjusting the sleeve 107, the bolts 110 are again tightened. The eye-bolt 105 has a nut 111 threaded thereon which bears on shoulders formed in the pitman 108.

It will be apparent that the structure just described effects reciprocation of the cross-head 103 and the bracket 102 secured thereto on rotation of the shaft 16. It will also be apparent that reciprocation of the bracket 102 causes oscillation of the plug valve 97. The parts are so dimensioned that reciprocation of the cross-head 103 causes the plug valve 97 to oscillate through an angle of substantially 90°. The valve is thus moved periodically from a position in which its bore is in alinement with the bore 98 to a position in which the valve bore is in alinement with the bore 99. The result of this construction is that when the valve bore is in the first-mentioned position, it is filled with cap-forming material, flowing thereto through the passage 94 and the bore 98. Similarly, when the valve plug is in the second-mentioned position, a predetermined amount of cap-forming material flows from the valve plug 97 through the passage 99 into one of the molds 50. To expedite the outflow of the cap-forming material trapped in the valve bore, a pipe 112 threaded into the plug body 93 in alinement with a bore 113 intersecting the valve socket and adapted to aline with the bore through the valve, may be connected to a source of air or other fluid, preferably gas, under pressure.

Cap-shaping mechanism

A forming die 114 extends downwardly from the bracket 102ᵃ and is adapted to enter the molds 50 to effect a final shaping of the cap-forming material poured around the head of a nail disposed in the mold. A plunger 115 also carried on the bracket 102ᵃ is adapted to enter the notches 36 to position the turntable 32 accurately for entry of the die 114 into the molds. The lengths of the die 114 and plunger 115 are such that the end of the plunger enters one of the notches 36 before the die enters one of the molds 50. The length of the die 114, furthermore, is such that, at the bottom of the stroke of the cross-head 103, the die exerts sufficient pressure on the cap-forming material in the mold to shape it substantially to the form shown at 116 in Fig. 9.

The cap-forming die 114 is disposed substantially 90° from the pouring mechanism, measured around the turntable 32 and, at the normal speed of the latter, the cap-forming material, if molten lead, has solidified in the molds 50 before the die makes contact therewith. Since lead flows under relatively light pressure, the shaping of the caps 116 by the die 114 is not attended with any difficulty.

Ejecting mechanism

The nails 52, after being inserted in the molds 50 by the nail feeding mechanism and having protective caps poured around the heads thereof by the pouring mechanism and being shaped by the shaping die, remain in the molds until they approach a point substantially diametrically opposite the pouring mechanism. A plunger 117 (see Fig. 3) is reciprocable through the shelf 15 and the bed 31 and is so positioned that it alines with the nails in the several molds as they advance successively. A link 118 is pivoted to the lower end of the plunger 117 and to one arm 119 of a double crank 120 secured to a shaft 121. The shaft 121 is journaled in bearings formed in the standard 11 and depending from the shelf 15. A second crank 122 secured to the shaft 121 is pivotally connected to a link 123 which is pivoted at its upper end to one arm of a bell crank 124. The bell crank 124 is pivoted to the standard 11 on a bearing 125. The other arm of the bell crank 124 is provided with a roller 126 serving as a follower for a cam 127 secured to the shaft 16. A tension spring 128 connected to the lower arm of the bell crank 124 and to a fixed point on the standard 11 holds the roller 126 in constant contact with the cam 127. The cam is so shaped and positioned on the shaft in such manner that by means of the cranks 124, 122 and 119, and the link 123, the plunger 117 is caused to effect an upstroke when one of the molds is in alinement therewith to raise the nail therein from the position shown in Fig. 9 to the position shown at the right-hand of the table 32 in Fig. 3.

When the nails have been raised to the intermediate position just mentioned, they are ready to be engaged by a throw-out arm 129 (see Fig. 5) having a slot 130 to receive the nail shanks. The throw-out 129 is secured to a push rod 131. The rod 131 is slidable longitudinally through bearings in a cam bracket 132 secured to the bed 31. The rod 131 has its lower end reduced and swiveled in a block 133. A link 134 is pivoted to the block 133 and the second and longer arm 135 of crank 120.

The bracket 132 has a cam slot 136 therein which is vertical throughout its lower portion, but in its upper portion curves around the bracket 132 in the portion thereof defining a part of a cylinder, the axis of which is that of the push rod 131. The throw-out 129 is provided at its outer end with a follower roller 137 positioned in the slot 136. By reason of this construction, on elevation of the push rod 131, the throw-out rises with it and without any rotation about the axis of the push rod for the first position of the stroke. When the roller 137 engages the curved portion of the slot 136, however, the throw-out 129 and the rod 131 are rotated about the axis of the latter. The timing of the operating mechanism is such that the rod 131 starts up only after the shank of a nail in one of the molds 50 which has been partially raised therefrom by the plunger 117, has entered the slot 130 in the throw-out 129. The nail so engaged is entirely removed from the mold 50 by the initial movement of the rod 131 and throw-out 129. The rotary movement of these parts, which is not effected, of course, until the nail shank has been completely removed from the mold, serves to discharge the nail laterally into any suitable receptacle such as a discharge chute or hopper.

Flash-trimming mechanism

Because of the necessity for working clearance between the die 114 and the molds 50, the metal forming the cap is sometimes forced upwardly between the die and molds when the former enters the latter to shape the caps, forming flash indicated at 139. We provide a flash-trimming mechanism (best seen in Fig. 3) effective automatically to remove this flash between the two steps of the ejecting operation. A trimming tool 140 is journaled in a bearing 141 secured to the bracket 102a, and is supported therein by a thrust collar 142. The tool 140 has a reduced upper end 143. A drive shaft 144 is journaled in a bearing 145 on one of the ways 104. The shaft 144 is driven by a motor 146 supported on a shelf 147 extending laterally from the transom 13, through a coupling 148. The shaft 144 has a telescoping connection with the upper end 143 of the tool 140, such as afforded by the pin and slot 150 and 151.

The tool 140 is so disposed that, when the table 32 stops with certain of its molds in alinement with the nail feeder, forming die and throw-out, the mold just behind that alined with the throw-out is alined with the tool 140. The tool, furthermore, being carried on the bracket 102a, reciprocates with the crosshead 103. This is permitted by the telescoping connection between the tool and its driving shaft 144. The tool 140 is thus lowered into engagement with the cap on a nail in the intermediate stage of its ejection, just after it has been raised to that position. The motor 146 is operated continuously so that on lowering of the cross head 103, the tool 140 descends by its own weight. The friction exerted on the nail by the spring-urged member in the radial hole 53 is sufficient to restrain the nail from rotation. As the flash is very thin, it is quickly removed by the cutting edges 152 of the tool 140, before the crosshead 103 reverses. The length of the tool 140 is such that it will not force the nail downwardly in its mold below a position in which it may be engaged by the throw-out 129.

Modified form of nail

Figs. 13 and 14 show a modified form of nail 153 having wings or webs 154 extending between the head and shank. These wings serve to position the heads above the bottoms of the molds 50. They also key the caps to the nailheads to prevent rotation of the latter on the former, and provide a tighter bond of the cap to the nail.

It will be clear from the foregoing description that the invention provides means for feeding nails from a loose mass thereof into molds spaced circumferentially of a turntable advancing step-by-step, at one point in the path of said molds; to pour a predetermined amount of cap-forming material into the molds at a point substantially 90° around the path of the molds from the point at which the nails were inserted; to subject the cap-forming material poured around the nail heads to a final shaping operation after it has solidified, at a point about 90° around the path of the molds from the pouring point; and finally, to remove the capped nails from the molds at a point about 90° around the path of the molds from the point where the final shaping is effected, after trimming the caps to remove any flash thereon. The nail feeding, cap-forming, flash-trimming and nail ejection are effected automatically during the periods of dwell between the step-by-step movements of the turntable, the movements of all portions of the apparatus being controlled by the design and operation of their actuating mechanisms so that the various functions are performed in the desired sequence. The turntable is positively positioned, furthermore, during a portion of the period of dwell, to insure the accurate alinement of the nail feeding, pouring, and cap-shaping means with the molds.

The invention is characterized by numerous advantages. In the first place, the construction is relatively simple and the machine can be operated by relatively unskilled or semi-skilled workmen; as no manual operations are required of the operator, but only visual inspection to make sure that it continues to operate in a normal manner. The machine can be operated, furthermore, at a speed sufficient to increase the output of skilled workmen now employed in capping nail heads by hand. A substantial reduction in cost of nails having capped heads is thereby effected.

A particular advantage results from the method of pouring the cap-forming material around the nail heads and then finally forming or shaping them. The cap-forming material is highly fluid when poured and, therefore, flows entirely around and under the nailhead, providing continuous protection therefor. The final forming or shaping of the caps makes them uniform in shape which is desirable for the sake of appearance and, furthermore, compacts the cap-forming material firmly around the nail head. A superior product of uniform appearance is the result.

Although we have illustrated and described herein but a preferred embodiment and practice of the invention, it will be understood that changes in the construction and procedure disclosed may be made without departing from the spirit of the invention or the scope of the appended claims.

We claim:

1. A nail capping machine comprising a turntable having a plurality of molds spaced circumferentially thereof adapted to receive nailheads, said molds and table having holes therethrough for nail shanks, means for partly lifting nails from said holes after formation of a cap thereon, and means below the surface of the table engaging the nail shanks for frictionally holding said partially lifted nails in elevated position.

2. A nail capping machine comprising a turntable having a plurality of molds spaced circumferentially thereof adapted to receive nailheads, said molds and table having holes therethrough for nail shanks, means for partly lifting nails from said holes after formation of a cap thereon, and means for trimming flash from said caps while the nails are in partially lifted position.

3. In a nail capping machine, a turntable having holes spaced circumferentially thereof adapted to receive the shanks of nails during the formation of caps on the heads thereof, a plunger adjacent the table and substantially perpendicular thereto, means mounting the plunger for axial reciprocation and rotation, a radial finger on said plunger adapted on rotation of the table to engage the shank of a nail partially ejected from one of said holes and, on axial movement of the plunger, to lift the nail entirely out of the hole, and means for rotating the plunger on axial movement thereof, to deliver the nail laterally of the table.

4. In a nail capping machine, a turntable having holes spaced circumferentially thereof adapted to receive the shanks of nails during the application of caps to the heads thereof, a plunger mounted adjacent said table for reciprocation longitudinally of said nails, said plunger having a radial finger, means for rotating said plunger as it reciprocates, and means for reciprocating the plunger on engagement of said finger by the shank of a nail in one of said holes, whereby the finger lifts the nail by its head and delivers the nail laterally of said table.

5. In a nail capping machine, a turntable having holes spaced circumferentially thereof adapted to receive the shanks of nails during the formation of caps on the heads thereof, a lifter rod adjacent said table and perpendicular thereto, means mounting said rod for axial and rotary movement, said rod having an arm thereon adapted to engage under the heads of the nails successively on rotation of the table, means for reciprocating said rod in timed relation to the movement of the table, and means for rotating said rod to swing said arm after it has lifted a nail from one of said holes.

6. In a nail capping apparatus, a nail-receiving mold, means for forming a cap on a nail disposed in said mold, means for partially ejecting the nail from the mold after formation of the cap, and a rotary cutter movable toward said mold for trimming said cap after partial ejection of the nail from the mold and while the nail is still supported therein.

7. In a nail capping machine, a turntable having holes spaced circumferentially thereof adapted to receive the shanks of nails during the formation of caps on the heads thereof, and a rotatable lifter adjacent said table for reciprocating movement longitudinally of said nails, said lifter having a radial finger adapted to engage the nail shanks successively on rotation of the table, and means for reciprocating said lifter on engagement of said finger by a nail shank, said finger being effective on reciprocation of the lifter to lift a nail from one of said holes by its head, and, on rotation of the lifter, to discharge the nail laterally.

8. In a method of capping nailheads, the steps including inserting the shank of a nail through a die, die-forming a cap on the head of the nail, partially ejecting the shank from the die, and trimming off the flash projecting from said cap while the shank remains partly in said die.

9. In a method of capping nailheads, the steps including inserting the shank of a nail through a die, forming a cap on the head of the nail, partially ejecting the shank from the die, and finishing the cap while supporting the nail by its shank in the die.

HARRY KING.
WILLIAM M. BELL.